US005222524A

United States Patent [19]

Sekler et al.

[11] Patent Number: 5,222,524

[45] Date of Patent: Jun. 29, 1993

[54] CONTROL DEVICE FOR FLUIDIC MEDIA IN PARTICULAR FOR COMPRESSED AIR

[75] Inventors: Thomas Sekler, Lahstedt; Walter Brausfeld, Hanover; Rudolf Möller, Gehrden, all of Fed. Rep. of Germany

[73] Assignee: Mannesmann Aktiengesellschaft, Düsseldorf, Fed. Rep. of Germany

[21] Appl. No.: 795,109

[22] Filed: Nov. 20, 1991

[30] Foreign Application Priority Data

Nov. 20, 1990 [DE] Fed. Rep. of Germany ....... 4037353

[51] Int. Cl.[5] .............................................. F16K 11/00

[52] U.S. Cl. ..................................... 137/884; 137/269

[58] Field of Search ................................ 137/884, 269

[56] References Cited

U.S. PATENT DOCUMENTS

| | | | |
|---|---|---|---|
| 4,095,864 | 6/1978 | Hardin | 137/884 X |
| 4,469,128 | 9/1984 | Petrimaux | 137/884 X |
| 4,938,258 | 7/1990 | Sato | 137/884 |

FOREIGN PATENT DOCUMENTS

| | | | |
|---|---|---|---|
| 0057078 | 4/1985 | Japan | 137/884 |
| 0104876 | 6/1985 | Japan | 137/884 |
| 0163579 | 6/1990 | Japan | 137/884 |

*Primary Examiner*—John C. Fox

*Attorney, Agent, or Firm*—Horst M. Kasper

[57] ABSTRACT

Individual base plate modules can be furnished with individual signals, however, several base plate modules can also be furnished with the same signal at the same point in time in a control device with in series disposed base plate modules (1). Protective ground conductors (7*a*), neutral conductors (6*a*), and signal conductors (8*a*) are provided for the electrical connections of the solenoid valves (2). Of these conductors, the protective ground conductor (7*a*) and the neutral conductor (6*a*) are pulled through and laid through in the longitudinal direction (10) of the series of modules. The signal conductor (8*a*) connects the solenoid valve (2) to the respective output of a signal source. A plurality of signal conductors (8) are disposed from the first to the last base plate module (1) and directed parallel in an electrically non-conductive support plate (13*a*), and adjoining to the pulled through and laid through protective ground conductor (7*a*) and to the neutral conductor (6*a*). An electrically conducting signal connector plate (13) is disposed above the support plate (13*a*). An electrical connection (13*b*) to the plug sockets (11) can be switched from each signal connector plate (13).

15 Claims, 2 Drawing Sheets

CONTROL DEVICE FOR FLUIDIC MEDIA IN PARTICULAR FOR COMPRESSED AIR

BACKGROUND OF THE INVENTION

1. Field of the Invention

The invention relates to a control device for fluidic media, in particular for compressed air, with in-series-disposed base plate modules. First fluid channels of the base plate modules, running aligned in longitudinal direction of the series of base plate modules, are sealingly joined to each other. A solenoid valve is coordinated to each base plate module, where controllably blockable or releasable second fluid channels join into the first fluid channels. In addition, a protective ground conductor, a neutral conductor, and a signal conductor are connected to each electromagnet. The protective ground conductor and the neutral conductor are connected and running through in longitudinal direction of the series disposition. The signal conductor connects the solenoid valve with the respective output of a signal source.

2. Brief Description of the Background of the Invention Including Prior Art

Such control devices, influencing and controlling fluid streams, employ solenoid valves, where in each case three contacts are required for their magnet coils: the neutral conductor for providing an electrical potential, a protective ground conductor for providing a protective conductor connection, and a signal conductor for the transmission of the control command.

In cases where several solenoid valves of this kind are to be disposed in series, each of these solenoid valves has to be connected to the three conductors. The protective ground conductor and the neutral conductor are in this case carried through from the first to the last device component and are contacted and picked up directly in case of attaching a valve. Since the in-series-disposed solenoid valves are in most cases not to be switched simultaneously, there has to be a wired connection for each individual solenoid valve to a respective output of the signal source.

A device for the control of machines with switch modules is known from the German Printed Patent document DE-C2 30 42 205, where the switch modules are composed of a pneumatic valve and an electric drive for the valve. The valve is disengageably connected to a pneumatic distributor strip and exhibits an electrical control module for the drive. In this case, the electrical control module is connected, on the one hand, electrically to the electromagnet via a multiplug and, on the other hand, via a further multiplug to an electrical distributor rail. An immediate coordination of control modules to a distributor rail is however not possible and desired in all cases. In case of the presence of such a control module, the base plate module is therefore of a rather complicated construction and the complete arrangement becomes very expensive.

SUMMARY OF THE INVENTION

1. Purposes of the Invention

It is an object of the present invention to further improve a modular control device system by employing simple means.

It is a further object of the present invention to provide a modular system for a control device for fluidic media which allows to switch in a simple way a larger number of in-series-disposable base plate modules, where either individual base plate modules are supplied with individual signals, or where several base plate modules can be furnished with the same signal at the same point in time.

It is yet a further object of the present invention to provide modules for fluid control which can be series connected to each other and which furnish a multiplicity of switching functions.

These and other objects and advantages of the present invention will become evident from the description which follows.

2. Brief Description of the Invention

According to the present invention there is provided for a control device for fluidic media, where the fluidic medium can be compressed air. Base plate modules are located and disposed in series and include a first base plate module and a last base plate module. First fluid channels are formed in the base plate modules and are sealingly joining each other and disposed in longitudinal direction of the in-series disposed base plate modules. A solenoid valve includes an electromagnet and is associated with each base plate module. Fluid ports are controllably blockable or releasable by the solenoid valve and are joining into second fluid channels. The second fluid channels are joining into the first fluid channels. An electrically non-conducting support plate is disposed next to a protective ground conductor and to a neutral conductor extending through the base plate modules. In each case the protective ground conductor, the neutral conductor, and a signal conductor are indirectly connected to a respective one of the electromagnets. The protective ground conductor and the neutral conductor are extending through in longitudinal direction of the series of base plate modules. The signal conductor connects the solenoid valve to a respective output of a signal source. A plurality of signal conductors are disposed in parallel direction from the first to the last base plate module in the electrically non-conducting support plate. An electrically conducting signal connector plate is disposed above the electrically non-conducting support plate. A plug socket is adapted to the protective ground conductor, the neutral conductor, and the signal conductor and associated with each base plate module. Each electrically conducting signal connector plate is connectable electrically to the plug socket.

Groups of contact openings can be disposed in the base plate modules and coordinated to the signal conductor and furnished in the electrically conducting signal connector plate. The signal conductor can be conducting within a selected contact opening of said groups of contact openings. A contact plug can be inserted into one of the contact openings and thereby enable a switching on of a connection to the electromagnet based on engagement of the contact plug with the selected contact opening.

The base plate module and the electrically non-conducting support plate, formed for insulating the electrically conducting signal connector plate, can be disposed and contained in a joint housing.

The base plate module can additionally serve as an attachment for the electrically conducting signal connector plate and for the electrically non-conducting support plate.

The present invention provides that a plug socket for the protective ground conductor, the neutral conductor, and the signal conductor is coordinated to each base plate module. There are disposed in parallel a plurality of signal conductors from the first to the last base plate module in a support plate, made of an electrically non-conducting material, adjoining to the pulled through protective ground conductor and to the neutral conductor. An electrically conducting signal connector plate is disposed above the support plate. An electrical connection to the plug socket can be switched on and off from each signal connector plate. Such a control device allows either to individually control a selected solenoid valve or to supply a desired subgroup of several solenoid valves jointly and simultaneously with the signal by employing simple constructive means.

An improved embodiment furnishes that groups of contact openings, coordinated to a pulled through insulated signal conductor, are disposed in the signal connector plate. The signal conductor is conducting within a selected contact opening. The connection to the electromagnet can be switched by way of a contact plug. The contact plugs serve in this context not only for the transfer of the electrical signal but also for allowing a recognition of the switching configuration.

According to a further improvement of the invention, the base plate module and the non-conducting support plate, furnished and formed for the insulation of the signal connector plate, are disposed and contained in a joint housing. This achieves in particular a compact construction and a correspondingly low space requirement for the control device.

It is further provided that the base plate module serves also as an attachment for the signal connector plate and for the support plate. This solution results in practically a single and uniform housing for the base plate module, the plug socket, the support plate, the signal connector plate, and the corresponding conductors.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENTS

Figure 1:
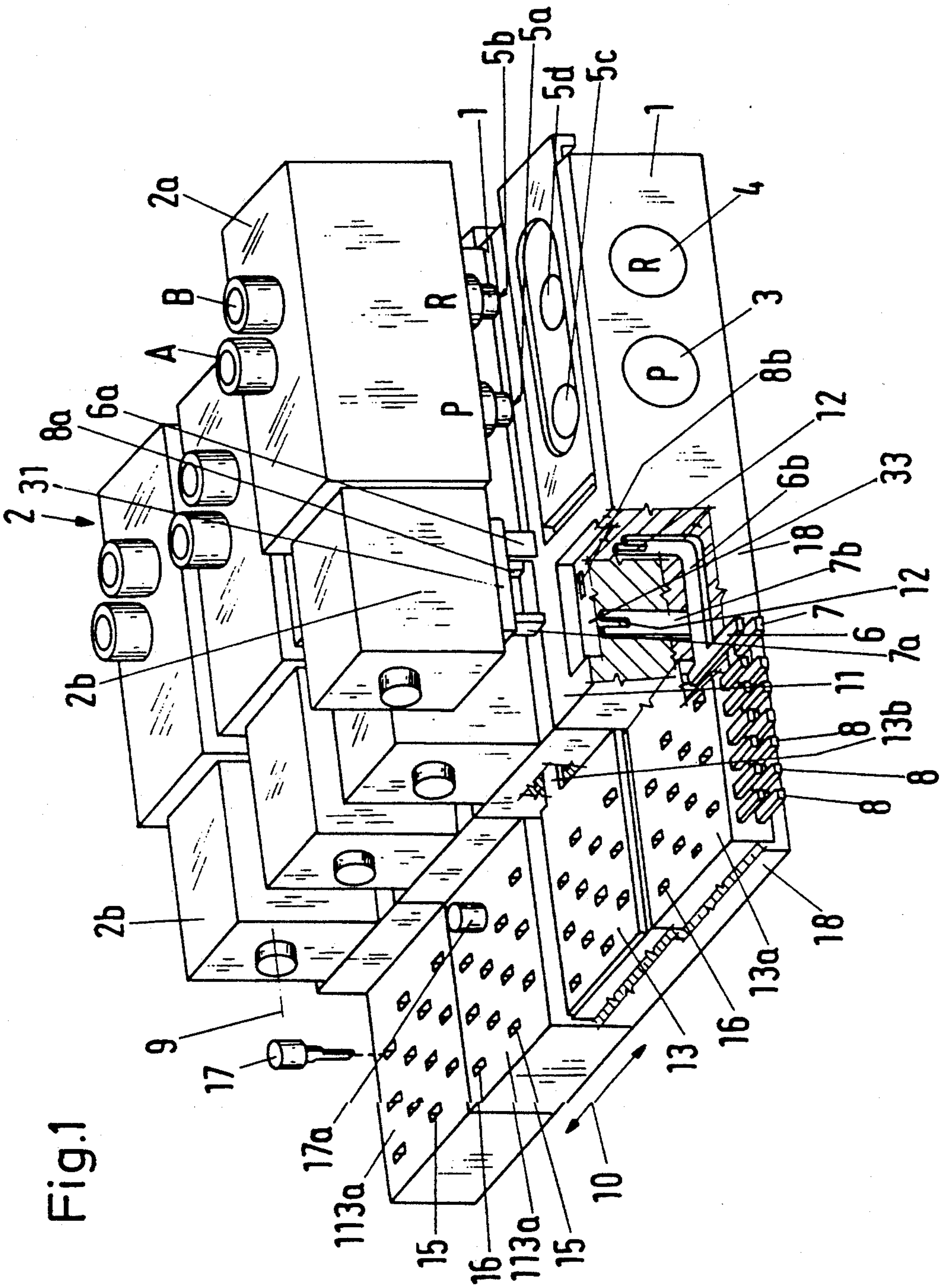
FIG. 1 is a schematic perspective view of a base plate module.
Figure 2:
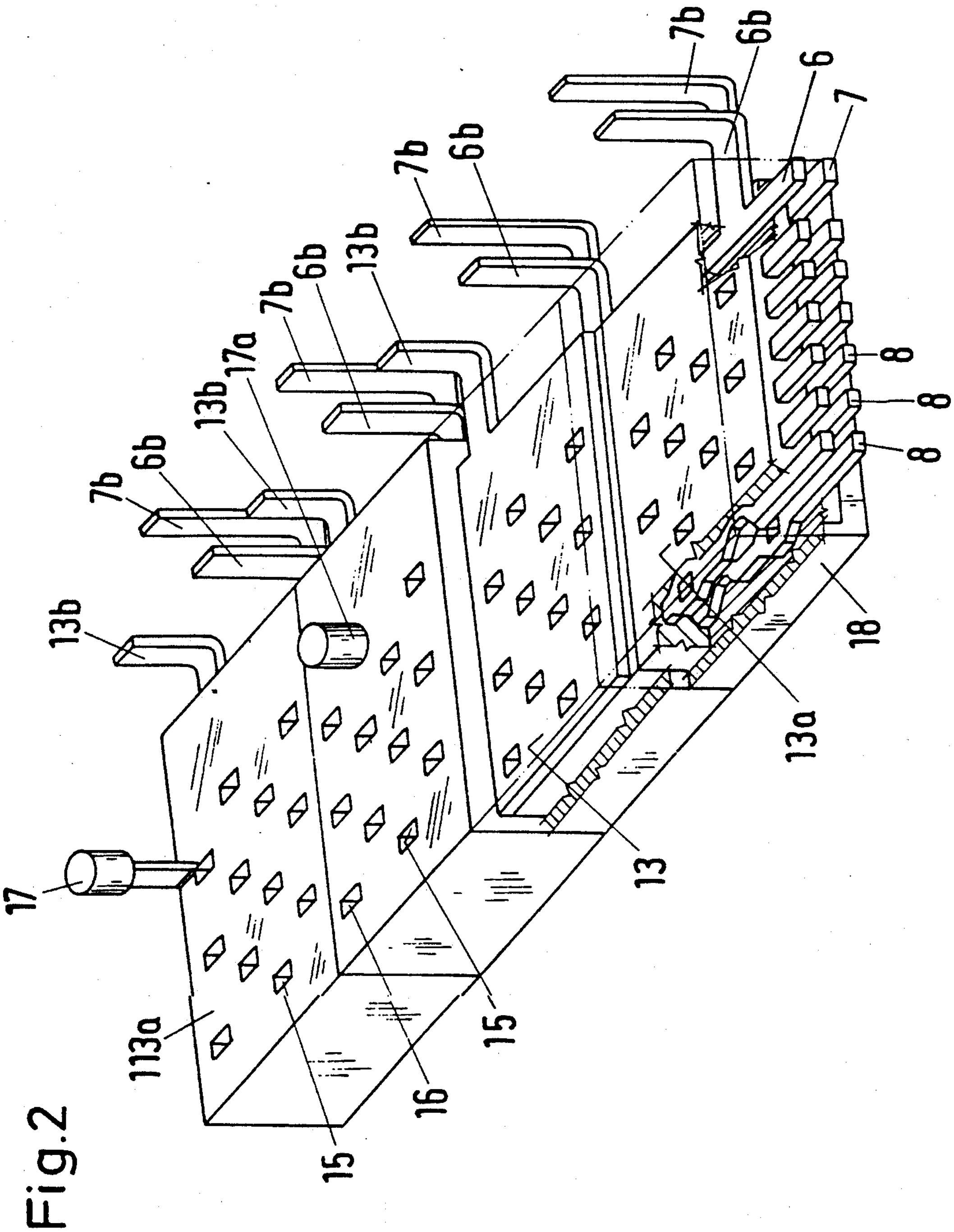
FIG. 2 is a perspective view of the invention structure without a base plate module and without valves.

According to the present invention, there is provided for a control device for fluidic media, in particular for compressed air. The control device is formed by in-series disposable base plate modules 1. First fluid channels 3, 4 of the base plate modules 1 are sealingly joining each other and are running aligned in longitudinal direction 10. A solenoid valve module 2 is coordinated to each base plate module 1. Fluid ports 5*a*, 5*b* of the solenoid valve module 2 are controllably blockable or releasable and join into second fluid channels 5*c*, 5*d* of the base plate module 1. The second fluid channels 5*c*, 5*d* are joining into the first fluid channels 3, 4. A protective ground conductor blade 7*a*, a neutral conductor blade 6*a*, and a signal conductor blade 8*a* are connected to a respective electromagnet 2*b*. A protective ground conductor 7 and a neutral conductor 6 are pulled through and laid through in longitudinal direction 10 of the series disposed base plate modules 1. The signal conductor blade 8*a* connects the solenoid valve module 2 with a respective output of a signal source. A plug socket 11 for a protective ground conductor terminal 7*b* connected to the respective protective ground conductor 7, for a neutral conductor terminal 6*b* connected to the respective neutral conductor 6, and for a signal conductor terminal 8*b* connected to the respective signal conductor 8, is coordinated to each base plate module 1. A plurality of signal conductors 8 are disposed from the first to the last base plate module 1 in parallel direction in an electrically non-conducting support plate 13*a* adjoining to the pulled through and laid through protective ground conductor 7 and to the neutral conductor 6. An electrically conducting signal connector plate 13 is disposed above the electrically non-conducting support plate 13*a* and is connected to a respective signal conductor terminal 8*b*. The electrically conducting signal connector plate 13 is connectable to one of the plurality of signal conductors 8.

Groups 15 of contact openings 16 can be furnished in the electrically conducting signal connector plate 13 and the electrically non-conducting support plate 13*a*, 113*a*. Each one of the contact openings 16 can be coordinated to one of the signal conductors 8. The one of the signal conductors 8 can be electrically conducting and connectable within a selected contact opening 16. The connection to the electromagnet 2*b* can be switchable by way of a contact plug 17.

The base plate module 1 and the electrically non-conducting support plate 13*a*, formed for insulating the electrically conducting signal connector plate 13, can be disposed and contained in a joint housing 18.

The base plate module 1 can additionally serve as an attachment for the electrically conducting signal connector plate 13 and for the electrically non-conducting support plate 13*a*.

Four connected base plate modules 1 can be recognized as an example of a control device for fluids. A solenoid valve module 2, comprising a pneumatic valve 2*a* and a connected electromagnet 2*b*, is furnished for and coordinated to each base plate module 1. The base plate modules 1 exhibit first fluid channels 3, 4, running aligned in the direction of a series connection formed by four units. In each case two base plate modules 1 are sealingly joining each other at the fluid channels 3, 4. Fluid ports 5*a*, 5*b*, join into second fluid channels 5*c* and 5*d* and into first fluid channels 3 and 4, respectively from the pneumatic valve 2*a*.

The switched fluid channels 3, 4, have output ports A, B, preferably directed upwardly from the pneumatic valve 2*a*. The output ports A, B, are preferably disposed at characteristic locations and otherwise characterized, for example, by color in order to avoid an erroneous connection in case more than one fluid channel 3, 4, is present at the solenoid valve module 2. The second fluid channels 5*c* and 5*d* joining into the fluid channels 3 and 4 are disposed with axes parallel to the connection direction of the protective ground conductor blade 7*a*, the neutral conductor blade 6*a* and the signal conductor blade 8*a*. Preferably, the upper ends of the conductor terminals 6*b*, 7*b*, 8*b* corresponding to the protective ground conductor 7, the neutral conductor 6, and the signal conductor 8, respectively, are disposed substantially in the same plane as the upper openings of the second fluid channels 5c and 5d. Thus, the lower plane of the solenoid valve module 2 is a single plane including the conductor blades 6a, 7a, 8a for making sliding electrical contact, and fluid ports 5a, 5b to be inserted into the fluid channels 5c and 5d.

The rows of fluid channels 3 and 4 are preferably disposed perpendicular to the conductor blades and terminals including neutral conductor blade 6a and neutral conductor terminal 6b, protective ground conductor blade 7a and protective ground conductor terminal 7b, and signal conductor blade 8a and signal conductor terminal 8b. Between the signal conductor 8 and the fluid channels 3, 4, there is disposed the electrical connections 13b of the support plate 13a to be engaged by a signal conductor terminal 8b disposed in the solenoid valve module 2 and, more particularly, in the electromagnet 2b.

The direction of the action of the solenoid valve module 2 is preferably perpendicular both to the direction of the series disposition the base plate modules 1 and perpendicular to the sliding connection direction of the electrical contact or signal conductor blade 8a in the signal conductor terminal 8b and the sliding connection direction between the fluid ports 5a, 5b connecting the solenoid valve modules 2 to the second fluid channels 5c and 5d of the base plate modules 1.

The solenoid valve modules 2 are preferably furnished with projections 31 which match recesses 33 in the plug socket 11 in order to allow a firm connection between the solenoid valve modules 2, the plug socket 11, and the support plate 13a which is not limited to the fastening effect provided by the contacts and the seals for the fluid channels 3, 4, 5a, 5b, but also by the shape-matching of the projections 31 of the electromagnet 2b into the plug socket 11 of the base plate module 1.

A protective ground conductor blade 7a, a neutral conductor blade 6a, and a signal conductor blade 8a are disposed at each solenoid valve module 2 or, respectively, at the electromagnet 2b. The four illustrated solenoid valve modules 2 form a row and the pulled through and laid through protective ground conductor terminals 7b and the neutral conductor terminals 6b run perpendicular to a longitudinal axis 9 of an electromagnet 2b. The longitudinal direction 10 of the row of solenoid valve modules 2 is disposed perpendicular to the direction of the longitudinal axis 9 of the moving core of the solenoid valve modules 2.

Each support plate 13a or signal conductor plate 13 is preferably further furnished with a separate contact opening allowing a separate connection to each signal conductor 8. Preferably, two signal conductors 8 are disposed on top of each other, i.e., in the insertion direction of the solenoid valve module 2 plugged into the plug socket 11 of the base plate module 1. The respective contact openings are preferably disposed in parallel to the direction of the superposed signal conductors 8. This is achieved by providing the signal conductor 8 such that contact can be made either in one contact opening with the upper disposed signal conductor 8 and in a second contact opening with the lower disposed signal conductor 8. The conductor destined not to make contact at such contact openings of the two-layer signal conductors 8 is either cut out or guided around the contact openings such that contact can only be made through one contact opening with one of two superposed signal conductors 8.

These pairs of signal conductors 8 can be disposed parallel to each other. The contact openings of the neighboring signal conductors 8 are preferably staggered relative to the first signal conductors 8 such that the position of the contacts of the neighboring signal conductors 8 are disposed in between the two contact openings of the first pair of signal conductors 8 as seen in the direction of the series of modules. Thus, it is possible to provide contact openings for all signal conductors 8 disposed at a substantial distance between the individual contact openings, while minimizing the distance between the signal conductors 8. The contact openings 16 are formed on the upper surface of the support plate 13a and are pattern-like arranged under formation of a parallelepiped with the sockets at the respective corners of the parallelepiped. The support plates 113a, 13a can further include a sliding base plate disposed such that it is possible to manually close the openings or one of the openings in case no solenoid valve module 2 is connected to a certain support plate 13a. This structure allows to continue operation with several of the solenoid valve modules 2 removed by providing a respective closing of the second fluid channels 5a and 5b in case no electromagnet 2b is connected.

The invention employs a signal connector plate 13. The signal connector plate 13 can be connected at will to a desired signal conductor 8. This connection is easily provided by inserting an electrically conducting plug 17, 17a into the support plate 13a at a desired location and thereby providing a connection between the signal connector plate 13 and the respective signal conductor 8. The signal connector plate 13 can also serve to provide contact between two or more signal conductors 8 by insertion of a corresponding number of electrically conducting plugs 17a at the respective position into the signal connector plate 13. This allows an easy and variable connection of the signal conductors 8 to the respective modules to be furnished with the switching signals. Thus, it is possible, for example, to connect each solenoid valve module 2 selectively to separate signal conductors 8 and, simultaneously, it is possible to connect, for example, all solenoid valve modules 2 to a single conductor 8. The change of the connection between the signal conductors 8 and the solenoid valve modules 2 is a matter of very quick removal of one contact plug 17a and insertion of a like plug into a different location. Thus, a very convenient way is provided of connecting solenoid valve modules 2 for allowing a connection of a multiple of pneumatic devices to a plurality of signal lines as desired.

Each base plate module 1, aligned and disposed on a rail, not illustrated, includes a plug socket 11 for the protective ground conductor terminal 7b or, respectively, for connecting the protective ground conductor blade 7a, the neutral conductor terminal 6b or, respectively, for connecting the neutral conductor blade 6a. A plug opening with the signal conductor terminal 8b for the signal conductor blade 8a is fabricated and disposed in the plug socket 11.

The protective ground conductor terminal 7b and the neutral conductor terminal 6b are preferably bent upwardly relative to the plane of the support plate 13a in order to provide a sliding contact with plug pins, provided by the protective ground conductor blade 7a and the neutral conductor blade 6a, disposed at the electromagnet 2b. An additional third pin, provided by the signal conductor blade 8a, can be provided for a signal conductor terminal 8b, which signal conductor terminal 8*b* is connected to one of the signal conductors 8 and which is also bent, by around 90 degrees, in order to provide a sliding contact with the signal conductor blade 8*a*. Preferably, the bending edge of the neutral conductor terminal 6*b*, the protective ground conductor terminal 7*b*, and the signal conductor terminal 8*b* is disposed, starting from the same plane, wherein the protective line is looped and passed through the support plate.

The protective ground conductor terminal 7*b* and the neutral conductor terminal 6*b* exhibit in each case receiver slots 12.

A plurality of signal conductors 8, from the first to the last base plate module 1, is pulled through, looped and laid through in a direction parallel to the longitudinal direction 10 below an electrically conducting signal connector plate 13 and within a support plate 13*a*, adjoining to the pulled through and laid through protective ground conductor 7 and to the neutral conductor 6. The pulled through and laid through signal conductors 8, however, are in general insulated relative to the electrically conducting signal connector plate 13 or, respectively, an electrically conducting connection is only furnished at certain defined positions, for example, by a dip switch, such that the electrical signal, coming from the output of the signal source, can be switched to the plug socket 11. The electrically conducting connection can thus already be created in the interior of the signal connector plate 13 at the time of production by a corresponding formation of the signal connector plate 13, for example by dip switches. A connection between the signal connector plate 13 and the signal conductor 8*a* is generated via the electrical connection 13*b* and via the plug opening providing the signal conductor terminal 8*b*.

An embodiment of particular interest is additionally illustrated in FIG. 1, where groups 15 of at least two contact openings 16 are furnished in the signal connector plate 13.

The signal conductor 8 is contacted either in an upper or in a lower plane within a selected contact opening 16. A contact plug 17, inserted into a contact opening 16, and designated in the inserted position with reference numeral 17*a*, switches in this case the electrical connection. A non-required contact opening 16 can also be closed by way of insulated contact plugs or with small covers.

It is possible to furnish all contacts in an elastic plane and coordinated to the openings. Upon contacting, a pin is pressed into the opening.

The elastic plane between two conductor layers can act as a separating layer against a passage of humidity and thus provide a separating function between the two conductor layers.

The base plate module 1 is further led into the plug socket 11 and, in addition, a non-conducting support plate 13*a*, formed for the insulation of the signal conductor plate 13, is disposed in a joint housing 18, as illustrated in FIG. 1 The support plate 13*a* can already be provided as a single part together with, and can be formed as part of, the housing 18. The support plate 13*a* is of course furnished with contact openings 16 suited for the signal connector plate 13.

The protective ground conductors 7, the signal conductors 8, and the neutral conductors 6 are preferably punched and/or cut out of a flat rolled material piece of conductive metal. The individual elements of the electrical signal conductors can have such a shape that the punching allows to obtain elements by a single cut by having a configuration of the signal conductors such that waste is avoided by having a shape of the signal conductors 8 such that the side edge of one signal conductor 8 corresponds in its shape to a side edge of a second signal conductor 8. Similarly, the contact plugs 17 can be formed with a conductive end of a flat plate. In case the contact plugs 17 are to be non-conducting material, they are formed by molding a non-conducting plastic material.

In this case, the base plate module 1 serves with its housing 18 also for an attachment of the signal connector plate 13.

It will be understood that each of the elements described above, or two or more together, may also find a useful application in other types of control devices differing from the types described above.

While the invention has been illustrated and described as embodied in the context of a control device for fluidic media, in particular for compressed air, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control device for fluidic media comprising
base plate modules located and disposable in series and including a first base plate module and a last base plate module;
first fluid channels formed in the base plate modules and sealingly joining each other and disposed in longitudinal direction of the in-series disposed base plate modules;
a solenoid valve including an electromagnet and associated with each base plate module;
second fluid channels;
fluid ports controllably blockable or releasable by the solenoid valve and joining into the second fluid channels, wherein the second fluid channels are joining into the first fluid channels;
a protective ground conductor;
a neutral conductor;
an electrically non-conducting support plate disposed next to the protective ground conductor and to the neutral conductor extending through the base plate modules;
a signal conductor, wherein in each case the protective ground conductor, the neutral conductor, and the signal conductor are indirectly connected to a respective one of the electromagnets, wherein the protective ground conductor and the neutral conductor are extending through in longitudinal direction of the series of base plate modules, and wherein the signal conductor connects the solenoid valve to a respective output of a signal source, wherein a plurality of signal conductors are disposed in parallel direction from the first to the last base plate module in the electrically non-conducting support plate;

an electrically non-conducting signal connector plate disposed above the electrically non-conducting support plate;

a plug socket adapted to the protective ground conductor, the neutral conductor, and the signal conductor and associated with each base plate module, and wherein each electrically conducting signal connector plate is connectable electrically to the plug socket.

2. The control device according to claim 1, wherein the fluidic medium is compressed air.

3. The control device according to claim 1, further comprising groups of contact openings disposed in the base plate modules and coordinated to the signal conductor and furnished in the electrically conducting signal connector plate, wherein the signal conductor is conducting within a selected contact opening of said groups of contact openings;

a contact plug insertable into one of the contact openings and thereby enabling a switching on of a connection to the electromagnet based on engagement of the contact plug with the selected contact opening.

4. The control device according to claim 1, wherein the base plate module and the electrically non-conducting support plate, formed for insulating the electrically conducting signal connector plate, are disposed and contained in a joint housing.

5. The control device according to claim 4, wherein the base plate modules serves additionally as an attachment for the electrically conducting signal connector plate and for the electrically non-conducting support plate.

6. A control device for fluidic media in particular for compressed air, comprising in series disposable base plate modules (1), wherein first fluid channels (3, 4) of the base plate modules (1) are sealingly joining each other and are running aligned in longitudinal direction (10), a solenoid valve module (2) coordinated to each base plate module (1), wherein fluid ports (5*a*, 5*b*) of the solenoid valve module (2) are controllable blockable or releasable and join into second fluid channels (5*c*, 5*d*) of the base plate module (1), wherein the second fluid channels (5*c*, 5*d*) are joining into the first fluid channels (3, 4), wherein a protective ground conductor blade (7*a*), a neutral conductor blade (6*a*), and a signal conductor blade (8*a*) are connected to a respective electromagnet (2*b*), wherein a protective ground conductor (7) and a neutral conductor (6) are pulled through and laid through in longitudinal direction (10) of the series disposed base plate modules (1), and wherein the signal conductor blade (8*a*) connects the solenoid valve module (2) with a respective output of a signal source, wherein a plug socket (11) for a protective ground conductor terminal (7*b*) connected to the respective protective ground conductor (7), for a neutral conductor terminal (6*b*) connected to the respective neutral conductor (6), and for a signal conductor terminal (8*b*) connected to the respective signal conductor (8), is coordinated to each base plate module (1), wherein a plurality of signal conductors (8) are disposed from the first to the last base plate module (1) in parallel direction in an electrically non-conducting support plate (13*a*) adjoining to the pulled through and laid through protective ground conductor (7) and to the neutral conductor (6), wherein an electrically conducting signal connector plate (13) is disposed above the electrically non-conducting support plate (13*a*) and is connected to a respective signal conductor terminal (8*b*), and wherein the electrically conducting signal connector plate (13) is connectable to one of the plurality of signal conductors (8).

7. The control device according to claim 6, further comprising groups (15) of contact openings (16) furnished in the electrically conducting signal connector plate (13) and the electrically non-conducting support plate (13*a*, 113*a*), wherein each one of the contact openings (16) is coordinated to one of the signal conductors (8), wherein the one of the signal conductors (8) is electrically conducting and connectable within a selected contact opening (16), and wherein the connection to the electromagnet (2*b*) is switchable by way of a contact plug (17).

8. The control device according to claim 6, wherein the base plate module (1) and the electrically non-conducting support plate (13*a*), formed for insulating the electrically conducting signal connector plate (13), are disposed and contained in a joint housing (18).

9. The control device according to claim 8, wherein the base plate module (1) serves additionally as an attachment for the electrically conducting signal connector plate (13) and for the electrically non-conducting support plate (13*a*).

10. The control device for fluid media comprising a first base plate module;

a first horizontal fluid channel formed in the first base plate module;

a first solenoid valve including a first electromagnet and associated with the first base plate module;

a first vertical fluid channel;

a fluid port controllably blockable or releasable by the first solenoid valve and joining into the first vertical fluid channel, wherein the first vertical fluid channel joins into the first horizontal fluid channel; a first protective ground conductor blade connected to the first electromagnet;

a first neutral conductor blade connected to the first electromagnet;

a first signal conductor blade connected to the first electromagnet;

a first plug socket formed at the first base plate module;

a first protective ground conductor terminal disposed in the first plug socket and adapted to engage with the first protective ground conductor blade;

a first neutral conductor terminal disposed in the first plug socket and adapted to engage with the first neutral conductor blade;

a first signal conductor terminal disposed in the first plug socket and adapted to engage with the first signal conductor blade;

wherein the first protective ground conductor blade, the first neutral conductor blade, and the first signal conductor blade extend in a direction perpendicular to the first base plate module, and wherein the first signal conductor blade connects the first solenoid valve to a respective output of a signal source;

a first electrically non-conducting support plate disposed next to the first protective ground conductor blade of the first electromagnet and to the first neutral conductor blade of the first electromagnet;

a first protective ground conductor connected to the first protective ground conductor terminal;

a first neutral conductor connected to the first neutral conductor terminal;

a plurality of first horizontal signal conductors disposed aligned in parallel direction in the first electrically non-conducting support plate and adjacent to the first protective ground conductor and the first neutral conductor; a first electrically conducting signal connector plate disposed above the first electrically non-conducting support plate and connected to the first signal conductor terminal; connection switch means disposable between one of the plurality of first horizontal signal conductors and the first electrically conducting signal connector plate.

11. The control device for fluidic media according to claim 10, further comprising a second base plate module, wherein the first base plate module and the second base plate module are disposable in series;

a second horizontal fluid channel formed in the second base plate module, wherein the first horizontal fluid channel in the first base plate module and the second horizontal fluid channel in the second base plate module sealingly join each other, when the first base plate module and the second base plate module are disposed sequentially and in series, and wherein the first horizontal fluid channel and the second horizontal fluid channel are directed in sequential longitudinal direction of the base plate modules;

a second solenoid valve including a second electromagnet and associated with the second base plate module;

a second vertical fluid channel;

a fluid port controllably blockable or releasable by the second solenoid valve and joining into the second vertical fluid channel, wherein the second vertical fluid channel joins into the second horizontal fluid channel;

a second protective ground conductor blade connected to the second electromagnet;

a second neutral conductor blade connected to the second electromagnet;

a second signal conductor blade connected to the second electromagnet;

a second plug socket formed at the second base plate module;

a second protective ground conductor terminal disposed in the second plug socket and adapted to engage with the second protective ground conductor blade;

a second neutral conductor terminal disposed in the second plug socket and adapted to engage with the second neutral conductor blade;

a second signal conductor terminal disposed in the second plug socket and adapted to engage with the second signal conductor blade;

wherein the second protective ground conductor blade, the second neutral conductor blade, and the second signal conductor blade extend in a direction perpendicular to the second base plate module, and wherein the second signal conductor blade connects the second solenoid valve to a respective output of a signal source;

a second electrically non-conducting support plate disposed next to the second protective ground conductor blade of the second electromagnet and to the second neutral conductor blade of the second electromagnet;

a second protective ground conductor connected to the second protective ground conductor terminal;

a second neutral conductor connected to the second neutral conductor terminal;

a plurality of second horizontal signal conductors disposed aligned in parallel direction in the second electrically non-conducting support plate and adjacent to the second protective ground conductor and the second neutral conductor;

a second electrically conducting signal connector plate disposed above the first electrically non-conducting support plate and connected to the second signal conductor terminal; connection switch means disposable between one of the plurality of second horizontal signal conductors and the second electrically conducting signal connector plate.

12. The control device according to claim 10, wherein the fluidic medium is compressed air.

13. The control device according to claim 10, further comprising groups of contact openings coordinated to a pulled through and laid through insulated signal conductor and furnished in the signal connector plate, wherein the signal conductor is exposing a conducting face within a selected contact opening of said groups of contact openings, wherein the connection switch means is a contact plug, providing a switchable connection to the electromagnet based on engagement of the contact plug with the selected contact opening.

14. The control device according to claim 10, wherein the base plate module and the electrically non-conducting support plate, formed for insulating the electrically conducting signal connector plate, are disposed and contained in a joint housing.

15. The control device according to claim 14, wherein the base plate module serves additionally as an attachment for the electrically conducting signal connector plate and for the electrically non-conducting support plate.

* * * * *